(12) United States Patent
Currie et al.

(10) Patent No.: US 6,184,330 B1
(45) Date of Patent: Feb. 6, 2001

(54) CONTINUOUS PROCESS FOR PRODUCING A SILICONE POLYMER

(75) Inventors: John Currie; Phillip Griffith, both of Penarth; William Herron, Cowbridge; Richard Taylor, Barry, all of (GB)

(73) Assignee: Dow Corning Limited, Barry Wales (GB)

( * ) Notice: Under 35 U.S.C. 154(b), the term of this patent shall be extended for 0 days.

(21) Appl. No.: 09/383,902

(22) Filed: Aug. 26, 1999

(30) Foreign Application Priority Data

Aug. 26, 1998 (GB) ................................... 9818541

(51) Int. Cl.$^7$ .................................... C08G 77/08
(52) U.S. Cl. ................ 528/23; 528/27; 528/23; 528/33; 528/37; 524/860
(58) Field of Search .................. 528/21, 23, 33, 528/37; 524/860

(56) References Cited

U.S. PATENT DOCUMENTS

| 4,250,290 | * | 2/1981 | Petersen . | |
| 4,431,771 | | 2/1984 | Falender et al. | 524/863 |
| 4,448,927 | | 5/1984 | Falender et al. | 524/860 |
| 4,486,567 | | 12/1984 | Bowman et al. | 524/863 |
| 4,551,515 | | 11/1985 | Herberg et al. | 528/18 |
| 5,688,888 | | 11/1997 | Burkus, II et al. | 528/22 |
| 5,883,215 | * | 3/1999 | Biscoff et al. . | |
| 6,001,928 | * | 12/1999 | Harkness et al. . | |
| 6,054,548 | * | 4/2000 | Currie et al. . | |

FOREIGN PATENT DOCUMENTS

| 0 019 093 | 4/1980 | (EP) | H01M/2/14 |
| 0 019 816 | 5/1980 | (EP) | G01F/23/26 |

OTHER PUBLICATIONS

Polymer Preprints, vol. 37, No. 2, 668–669, (1996), Van Dyke and Clarson, "Reaction Kinetics for the Anionic Ring–Opening Polymerization of Tetraphenyltetramethylcyclotetrasiloxane USing Fast Catalyst System".

Macromolecular Rapid Communications, vol. 16, 449–453 (1995), Molenberg and Moller, "A Fast Catalyst System for the Ring–Opening Polymerization of Cyclosiloxanes".

Liebigs Annalen, vol. 7, 1055–1081 (1996), Schwesinger et al., "Extremely Strong, Uncharged Auxiliary Bases; Monomeric and Polymer–Supported Polyaminophosphazenes (P2–P5)".

* cited by examiner

*Primary Examiner*—Robert Dawson
*Assistant Examiner*—Marc S. Zimmer
(74) *Attorney, Agent, or Firm*—William F. Boley; Jennifer S. Warren

(57) ABSTRACT

A continuous process for producing a silicone polymer comprises the sequential steps of (i) polymerisation of a linear silanol group containing siloxane by condensation polymerisation, or of a cyclosiloxane by ring opening polymerisation, or of a mixture of said linear and cyclosiloxanes with a phosphazene base in the presence of water and the presence or absence of a filler in a static mixer, (ii) neutralising the reaction mixture in a static mixer, an in-line mixer or an extruder, and (iii) stripping the neutralised reaction mixture to remove volatile materials. Preferably step (ii) is performed in a static mixer and step (iii) is performed in a thin film stripper, extruder or co-rotating processor.

10 Claims, 1 Drawing Sheet

CONTINUOUS PROCESS FOR PRODUCING A SILICONE POLYMER

Figure 1:
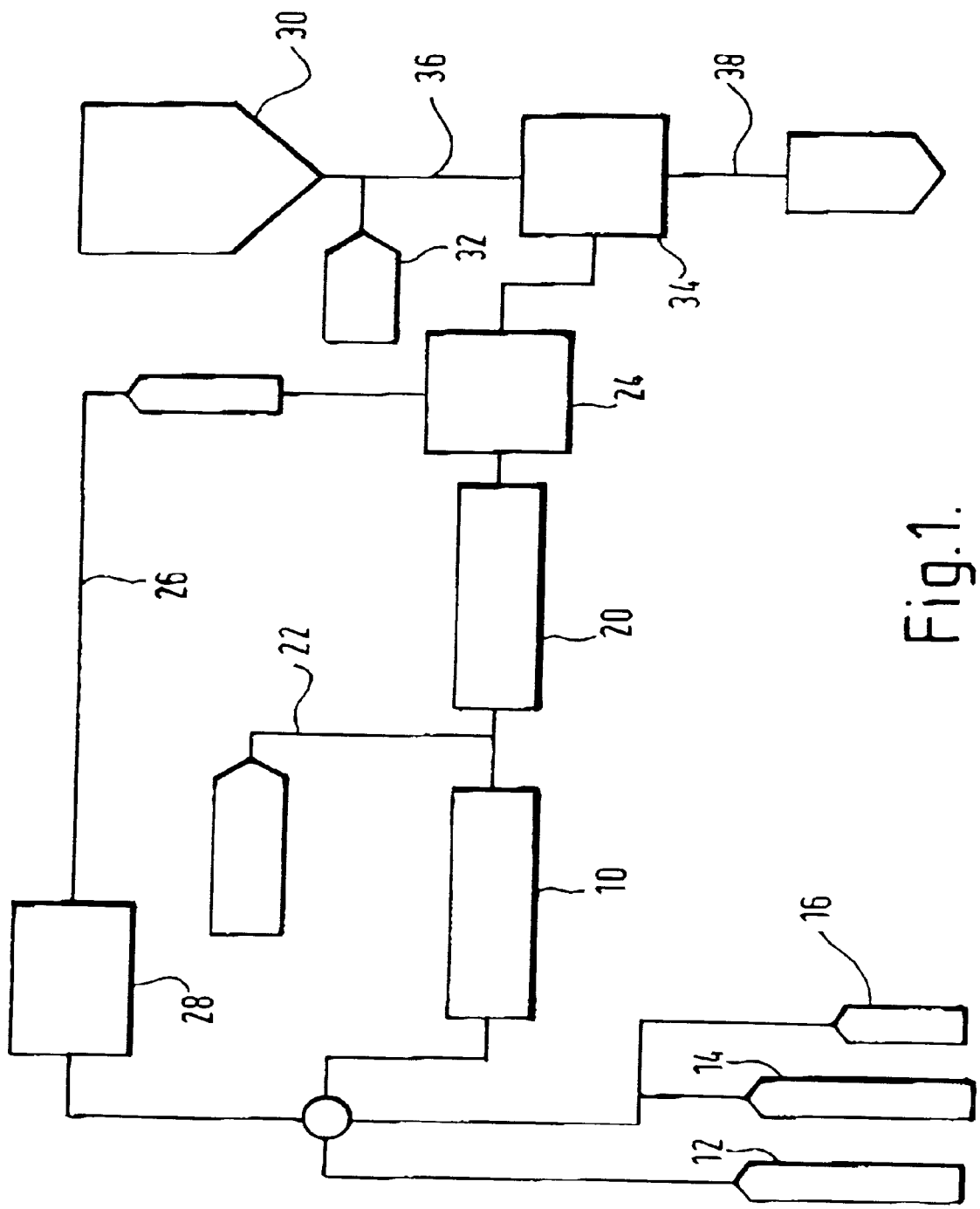

The present invention relates to a continuous process for producing a silicone polymer, in particular a continuous process for producing a silicone polymer by polymerisation of siloxanes in the presence of water and the presence or absence of a filler catalysed by a phosphazene base.

Cyclosiloxanes are critical intermediates in the silicone industry, primarily as starting materials for polymerisation reactions. Several general routes are known for the preparation of cyclosiloxanes. Together with hydroxy-endblocked linear polydiorganosiloxanes, they are formed as a product of hydrolysis of corresponding diorganodihalosilanes.

Various catalysts are known for the polymerisation of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerisation reactions can be carried out substantially in the absence of solvent, in solvents (such as non-polar or polar organic solvents) or in emulsion. An end-blocking agent may be used to regulate the molecular weight of the polymer and/or to add functionality, for example to add vinyl functional end groups. Polymerisation may be terminated by using a neutralising agent which reacts with the catalyst to render it non-active. In most cases catalyst residues and salts following neutralisation remain in the polymer product which may cause some re-equilibration of silicone polymer back to the siloxane starting materials. These residues and salts are desirably removed, such as by filtration. Volatile materials, including cyclosiloxanes, are removed from the silicone polymer by stripping, typically at temperatures of from 120 to 200° C. and under reduced pressure of 200 to 20000 Pa, to afford a silicone polymer having a volatile material content of typically from 1.0 to 5% by weight.

Another known process for producing a silicone polymer by polymerisation of siloxanes is condensation polymerisation of silanol or other hydrolysable group containing linear siloxanes. For example, in GB 2311994 there is described a method of effecting polycondensing which comprises contacting at a temperature of from 0 to 200° C. and a pressure up to $4.67 \times 10^{-4}$ Nm$^{-2}$, a silanol-containing organosiloxane with an amount of a peralkylated phosphazene base which is effective for polycondensation of said organosiloxane. The preferred peralkylated phosphazene base has the formula

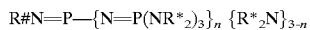

wherein R* is a $C_{1-4}$ alkyl radical, R* is a $C_{1-10}$ alkyl radical and n is 2 or 3.

Phosphazene bases are known to be extremely strong bases. Numerous phosphazene bases and routes for their synthesis have been described in the literature, for example in Schwesinger et al, Liebigs Ann. 1996, 1055–1081. The use of a phosphazene base catalyst for the ring-opening polymerisation of a cyclosiloxane on a laboratory scale has been described in Molenberg and Möller, Macromol Rapid Commun. 16, 449–453 (1995). Octamethylcyclotetrasiloxane (D4, where D denotes an —Si(CH$_3$)$_2$O— unit) was polymerised in toluene solution in the presence of methanol and the phosphazene base I described hereinbelow, used as a 1 molar solution in hexane. All the components were carefully dried before the reaction, which was carried out under an argon atmosphere containing less than 1 ppm O$_2$ and H$_2$O. The methanol was deprotonated by the phosphazene base to form methoxide ions which initiate the reaction. The phosphazene base catalyst was used in an amount of at least 871 ppm based on the weight of D4. A similar reaction system has been used by Van Dyke and Clarson in Poly Prep ACS Div Polym Chem 1996, 37, 668. In this case, tetraphenyltetramethyl-cyclotetrasiloxane, the phenylmethyl analog of D4, was polymerised. The catalyst system was the same as in Molenberg and Möller, but was used at concentrations which were higher based on the weight of D4, and again all the reaction components were carefully dried beforehand.

The present inventors have found that addition of this hexane/methanol activated catalyst gives erratic polymerisation behaviour. They therefore sought a catalyst medium that gives reproducible polymerisation, preferably without the need for solvent, and surprisingly found that it is possible to carry out polymerisation of siloxanes with a phosphazene base catalyst in the presence of water. To ensure the presence of water it is sufficient to avoid totally anhydrous conditions. Very small amounts of water, e.g. a few molecules, have been found to suffice to allow the polymerisation to take place. Furthermore, the present inventors found that it is not essential to form a methoxide ion, e.g. by using methanol, in contrast to the prior art teaching. Surprisingly, even lower levels of phosphazene base catalyst can be used where water is present, than were used in the prior art, whilst maintaining or improving the polymerisation efficiency.

Polymerisation of siloxanes may occur in the presence of a filler. Silicone polymer-filler mixtures are known for use as bases for various silicone rubber compositions, silicone compounds and greases, etc. Conventional mixtures are generally produced by first polymerising silicone oligomer into a silicone polymer with the desired viscosity and then mechanically mixing the resulting silicone polymer with the selected filler. However, such methods involve two different types of processes, necessitating a separate polymerisation step and mixing step.

As a result, the process is complicated and disadvantageous on a cost basis. In addition, it is difficult in such methods to mix and disperse filler into high-viscosity silicone polymers and large amounts of energy are consumed. This problem becomes particularly significant when the molecular weight of the silicone polymer is as high as that of a so-called gum.

Attempts have been made to overcome these problems by carrying out the polymerisation in the presence of the filler. U.S. Pat. No. 4,448,927 discloses a method of polymerising a hydroxy-endblocked polydiorganosiloxane and/or a poly-diorganocyclosiloxane in the presence of an acidic or neutral reinforcing filler and catalysed by trifluoromethane sulfonic acid. EP-A-0,019,816 discloses a method of bulk polymerisation of a hydroxy-endblocked polydiorganosiloxane and/or a polydiorganocyclosiloxane in the presence of an acidic or neutral reinforcing filler and catalysed by sulfuric acid or a sulfonic acid. EP-A-0,019,093 discloses a method of polymerising a hydroxy-endblocked polydiorganosiloxane in the presence of an inorganic reinforcing or extending filler and a basic diorganosilanolate catalyst. U.S. Pat. No. 4,431,771 discloses the polymerisation of a hydroxy-endblocked polydiorganosiloxane in the presence of an acidic or neutral reinforcing filler and a catalyst selected from sulfuric acid, sulfonic acids, perfluorinated alkane sulfonic acid, and a combination of quaternary ammonium carboxylate and carboxylic acid. While these processes have been successful with linear starting materials, they have been less successful with cyclosiloxanes, as the rates of polymerisation have generally been regarded as too slow.

Thus, the present inventors have found that phosphazene base catalysts are well suited for polymerisation of cyclosiloxanes in the presence or absence of fillers.

The present inventors have found that silicone polymers made by polymerisation of siloxanes catalysed by phosphazene bases have enhanced thermal stability over silicone polymers made using conventional catalysts. This enhanced thermal stability is attributed to the very low levels of catalyst residues remaining in the product after catalyst neutralisation. Thus, stripping of silicone polymers having enhanced thermal stability may be effected at correspondingly higher temperatures than those used for stripping silicone polymers made using conventional catalysts, which results in correspondingly lower volatile materials content in the final silicone polymer. The low catalyst residues also mean that a filtration step is usually not necessary.

Processes for continuous production of silicone polymers are known in the art. U.S. Pat. No. 4,250,290 describes a continuous process which comprises performing the polymerisation reaction in a static mixer, neutralising the catalyst in a further static mixer and stripping the neutralised silicone polymer in a liquid-vapour entrainment separator. U.S. Pat. No. 4,551,515 also describes a continuous process for producing silicone gums which comprises performing the polymerisation reaction in a static mixer, neutralising the catalyst in a screw extruder and removing volatile materials under vacuum.

The present inventors have found that the high speed of the polymerisation reaction and low levels of catalyst required when using phosphazene base catalyst allow for the use of smaller reactors than are used for conventional silicone polymer production processes, for lower volumes of material to be in the continuous process at any given time, and for fast changeover from production of a first material to production of a second. Consequently, production of silicone polymers using phosphazene base catalyst is particularly suited to a continuous process.

According to the present invention there is provided a continuous process for producing a silicone polymer, which process comprises the sequential steps of (i) polymerisation of a linear silanol group containing siloxane by condensation polymerisation, or of a cyclosiloxane by ring opening polymerisation, or of a mixture of said linear and cyclosiloxanes with a phosphazene base in the presence of water and the presence or absence of a filler in a static mixer, (ii) neutralising the reaction mixture in a static mixer, an in-line mixer or an extruder, and (iii) stripping the neutralised reaction mixture to remove volatile materials.

For the avoidance of any doubt, use of the word "comprises" herein means "consists of or includes".

Step (i) of the present invention is performed in a static mixer, and any conventional static mixer may be used. The siloxane starting material, phosphazene base catalyst, and optionally filler and/or endblocker are simply fed into the static mixer and the polymerisation reaction is allowed to occur, as described below.

The phosphazene base reacts with trace quantities of water present to form highly active hydroxide ions which initiate the polymerisation. The phosphazene base will also react with certain other chemical groups which may be present, e.g. silanol or alcohol, to form similarly active polymerisation-initiating species. The phosphazene base may be in ionic form, with a strong anion such as fluoride or hydroxide, which is active in initiating polymerisation.

As the phosphazene base is a very powerful catalyst for the polymerisation it can be present in a relatively low proportion, for example 1–750 ppm by weight based on the weight of siloxane. A preferred range is 1–500 ppm by weight, more preferably 10–100 ppm. The proportion of catalyst actually used will be selected depending on the polymerisation product that is sought.

In the simplest case, sufficient water can be provided for the ring-opening polymerisation reaction simply by taking no special steps to dry the filler or the siloxane starting material. The proportion of water present in the reaction is preferably at least 0.5, more preferably from 0.5–10, mols per mol of phosphazene base, most preferably from 1–10 mols per mol of phosphazene base. It is possible to employ higher proportions of water, and this can have the benefit of enabling greater control over the polymerisation reaction, as described in more detail below.

In principle, any phosphazene base is suitable for use in the present invention. Phosphazene bases have the following core structure $P=N-P=N$, in which free N valencies are linked to hydrogen, hydrocarbon, $-P=N$ or $=P-N$, and free P valencies are linked to $-N$ or $=N$. A wide range of suitable phosphazene bases has been described in Schwesinger et al (see above). Some phosphazene bases are commercially available from Fluka Chemie AG, Switzerland. The phosphazene bases preferably have at least 3 P-atoms. Some preferred phosphazene bases are of the following general formulae:

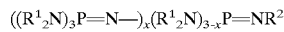

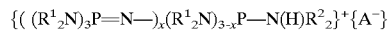

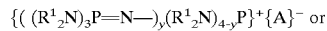

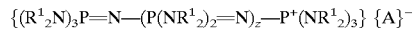

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ alkyl group; x is 1, 2 or 3, preferably 2 or 3; y is 1, 2, or 4, preferably 2, 3 or 4; z is an integer of from 1 to 10, preferably 1, 2, or 3; and A is an anion, preferably fluoride, hydroxide, silanolate, alkoxide, carbonate or icarbonate.

The compounds of the formula

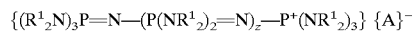

may be made by a method which comprises reacting a linear phosphonitrile halide compound, preferably chloride, with a compound selected from a secondary amine, a metal amide and a quaternary ammonium halide to form an aminated phosphazene material, followed by an ion exchange reaction replacing the anion with a nucleophile. Phosphonitrile halide compounds and methods of making them are well known in the art; for example, one particularly useful method includes the reaction of $PCl_5$ with $NH_4Cl$ in the presence of a suitable solvent. Secondary amines are the preferred reagent for reaction with the phosphonitrile halide, and a suitable secondary amine has the formula $R^3{}_2NH$, wherein $R^3$ is a hydrocarbon group having up to 10 carbon atoms, or both $R^3$ groups form a heterocyclic group with the nitrogen atom, for example a pyrollidine group, a pyrrole group or a pyridine group. Preferably, $R^3$ is a lower alkyl group, more preferably a methyl group, or both $R^3$ groups form a pyrollidine ring. Suitable preferred secondary amines include dimethylamine, diethylamine, dipropylamine and pyrollidine. Preferably the reaction is carried out in the presence of a material which is able to capture the exchanged halides, e.g. an amine such as triethylamine. The resulting by-product (e.g. triethyl ammonium chloride) can then be removed from the reaction mixture, e.g. by filtration. The reaction may be carried out in the presence of a suitable solvent for the phosphonitrile chloride and linear phosphazene base. Suitable solvents include aromatic solvents such as toluene. The linear phosphazene material which is formed this way must then be passed through an ion exchange reaction (preferably an ion exchange resin) whereby the anion is replaced with a hard nucleophile, preferably hydroxyl or alkoxy, most preferably hydroxyl. Suitable ion exchange systems include any known ion exchange systems, e.g. ion exchange resins, and no further detailed description is given. The phosphazene is preferably dispersed in a suitable medium prior to passing through an ion exchange system. Suitable media include water, alcohol and mixtures thereof.

In particularly preferred phosphazene base compounds for use in the present invention, $R^1$ is methyl, $R^2$ is tert. butyl or tert. octyl, x is 3, y is 4 and A is fluoride or hydroxide. A preferred compound is the phosphazene base I:

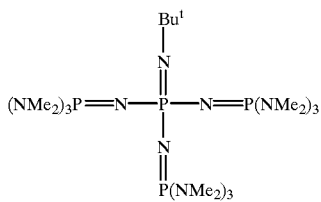

I

The polymerisation can be carried out in the absence or presence of a solvent. Suitable solvents are liquid hydrocarbons or silicone fluids. The phosphazene base catalyst can be diluted in a hydrocarbon solvent, such as hexane or heptane, or dispersed in a silicone fluid. Where the phosphazene base catalyst is initially in a solvent such as hexane, the hexane can be removed by evaporation under vacuum, and the catalyst dispersed in a silicone fluid to give a stable clear solution. When this silicone dissolved catalyst is used for polymerisation reactions, the catalyst disperses evenly and gives reproducible results. The catalyst can also be dissolved in water, and this has the advantage of moderating and enabling greater control over the polymerisation reaction, as described below.

The polymerisation reaction may be carried out in the static mixer at ambient temperature, but is preferably carried out under heating. Heating, for example to 100° C. or higher, is appropriate when the catalyst activity has been moderated as described below. The time taken for polymerisation will depend on the activity of the catalyst in the chosen system, and on the desired polymer product. In the absence of moderation, the phosphazene base catalysts are sufficiently active to convert cyclosiloxanes such as D4 to high molecular weight polysiloxane gums within a few seconds.

Starting materials for the condensation reaction of silanol containing siloxanes are organosiloxanes having silicon-bonded hydroxyl groups or hydrolysable groups such as alkoxy or aryloxy groups, which may form silanol groups in situ. These include, for example, organosiloxanes having the general formula $R^4O(SiR^5{}_2O)_tH$ wherein $R^4$ is a hydrogen or an alkyl or aryl group having up to 8 carbon atoms, each $R^5$ is the same or different and denotes a monovalent hydrocarbon group preferably having 1 to 18 carbon atoms or halogenated hydrocarbon group preferably having 1 to 18 carbon atoms and t is an integer of at least 2. Preferably $R^5$ denotes an alkyl group having from 1 to 6 carbon atoms and more preferably a methyl group. The value of t is preferably such that the average viscosity of the organopolysiloxanes does not exceed 200 mm²/s at 25° C.

Suitable organosiloxanes may have silicon-bonded hydroxyl groups or other silanol-forming hydrolysable groups which are in the polymer chain, but preferably these are present in end-groups. organosiloxanes having terminal silicon-bonded hydroxyl groups are well known in the art and are commercially available. They can be made by techniques known in the art, for example, by hydrolysis of a chlorosilane, separation of the linear and cyclic material produced by the hydrolysis, and subsequently polymerising the linear material. Preferably suitable organosiloxanes have one silicon-bonded hydroxyl group in each terminal group and have at least 80% of the $R^5$ groups denote a methyl group. Suitable organosiloxanes for use as reagents in a polymerisation process in which the phosphazene base catalysts are used include organosiloxanes having terminal hydroxydiorganosiloxane units, e.g. hydroxyldimethyl siloxane end-blocked polydimethylsiloxanes, hydroxyldimethyl siloxane end-blocked polydimethyl polymethylphenyl siloxane copolymers.

Starting materials for the ring-opening polymerisation reaction are cyclosiloxanes (also known as cyclic siloxanes). Cyclic siloxanes which are useful are well known and commercially available materials. They have the general formula $(R_2SiO)_n$, wherein R denotes hydrogen or an optionally substituted alkyl, alkenyl, aryl, alkaryl or aralkyl group having up to 8 carbon atoms, n denotes an integer with a value of from 3 to 12. R can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzyl. The preferred groups are methyl, ethyl, phenyl, vinyl, and trifluoropropyl. Preferably at least 80% of all R groups are methyl or phenyl groups, most preferably methyl. It is most preferred that substantially all R groups are methyl groups. Preferably the value of n is from 3 to 6, most preferably 4 or 5. Examples of suitable cyclic siloxanes are octamethylcyclotetra-siloxane, decamethylcyclopentasiloxane, penta(methylvinyl)-cyclopentasiloxane, tetra (phenylmethyl) cyclotetrasiloxane and pentamethylhydrocyclopentasiloxane. One particularly suitable commercially available material is a mixture of octamethylcyclotetrasiloxane and decamethylcyclopentasiloxane.

Where R is methyl, the compound is referred to as Dn; for example, where n=4 the compound is called D4.

We have found during preparation of the phosphazene base catalysts that air reacts very rapidly with the catalyst solutions giving a hazy material which eventually leads to an insoluble liquid phase. This is believed to be due to the reaction of the catalyst with water and/or $CO_2$ to form an insoluble hydroxide or carbonate salt. We have also found that this deactivation of the catalyst can be reversed, e.g. by heating, purging with inert gas or subjecting the mixture to reduced pressure. This makes it possible to moderate or control the polymerisation reaction. This is particularly advantageous in view of the very rapid reaction which occurs when the reaction is not moderated. Because of the very low levels of catalyst employed in these reactions (which can be as low as 1–10 ppm), the reaction with water and $CO_2$ needs to be taken into account to control the reaction and obtain reproducible results. By dissolving the phosphazene base in a large excess of water, in which it is very soluble and very stable, the catalyst activity becomes much more controllable and the polymers produced are of lower molecular weight. This is caused by the water acting as a catalyst inhibitor and also as an endblocker. The inhibiting effect of the water can be reduced by reducing the amount of water present e.g. by heating. At temperatures below 100° C. the rate of polymerisation is relatively slow in the presence of water and/or $CO_2$, for example taking up to more than 24 hours to reach gum viscosity. At temperatures above 100° C. (e.g. 100–150° C.), polymerisation becomes much faster in the presence of water and/or $CO_2$, for example taking up to 5–60 minutes to reach gum viscosity. Such control of the reaction can also be achieved if the water is mixed with or replaced by alcohol (e.g. $C_1$–$C_6$ alcohols such as methanol or ethanol).

We have also found that polymerisation can be prevented by exposing a mixture of siloxane starting material and phosphazene base catalyst to air and/or $CO_2$. The polymerisation can then be initiated ("command polymerisation") simply by removing the air and/or $CO_2$ e.g. by heating the mixture (e.g. to 100° C. –140° C. for a few minutes). A D4 catalyst mixture (2–50ppm of catalyst) is stable in the presence of air and/or $CO_2$ at 20° C. for extended periods (up to 7 days).

The reaction mixture is generally purged with inert gas, preferably nitrogen, prior to addition of the catalyst so as to remove any dissolved $CO_2$. Because of the extremely rapid reaction, the reaction mixture is vigorously mixed in the static mixer to ensure homogenous dispersion of the catalyst. Inadequate mixing can result in the catalyst being encapsulated in beads of gum as it is added to the reaction, and the catalyst then takes some time to diffuse out of the gum particles, giving a slower reaction.

The process according to the invention can be used to make gums of high molecular weight, for example from $1 \times 10^6$ to $100 \times 10^6$. The molecular weight of silicone polymers is limited by the concentration of end groups and in the absence of added endgroups is determined by the catalyst concentration. The catalyst used in the present invention has sufficient activity to afford polymers in a reasonable time at a low catalyst concentration even in the presence of fillers. Uses of these high molecular weight polymers with or without fillers include high consistency rubber, drag-reducing additives for oil pipelines, personal care products and sealants. We have found that phosphazene base catalysts when used at very low concentrations (2–500 ppm) based on the weight of the siloxane starting materials produce polymers with very high molecular weights (1,000,000–100,000,000) very quickly (10 s-8 h) at moderate to low temperatures (20–100° C.). Molecular weight changes during polymerisation can be monitored by sampling the reaction during polymerisation, and analysing each sample by GPC (gel permeation chromatography) to determine the molecular weight. Polymers of very high molecular weights can be obtained almost immediately. The process can be used to produce ultra high molecular weight materials. This is by virtue of the very low catalyst concentrations needed for the polymerisation, with the result that the molecular weight of the polymer produced is dependent on the end group concentration which is equal to the catalyst concentration. However, we have found that at very low catalyst concentrations, such as 2 ppm, the molecular weight obtained increases with reaction time. The process may be limited by diffusion of the catalyst, which is very slow in these high molecular weight polymers.

As an alternative to high molecular weight gums, the process according to the invention can also be used in equilibration reactions to produce silicone fluids, for example in the viscosity range at 25° C. of from 1 to 150,000 $mm^2/s$. An endblocker is included in the reaction mixture in a proportion calculated to produce the desired molecular weight of polymer. Suitable endblockers are, for example, polysiloxanes in the molecular weight range from 160 upwards, in particular polydimethylsiloxanes of the general formula $MD_xM$ where M is trimethylsilyl, D is —Si($CH_3$)$_2$O— and x has a value of from 0 to 20. The endblocker may have one or more functional groups such as hydroxy, vinyl or hydrogen. Water also acts as a endblocker, with the introduction of hydroxy functional groups.

The ring-opening polymerisation of step (i) may take place in the presence of a filler. The silicone polymer containing filler so produced is suitable for use as an electrical insulation grease, a sealant or as a reinforced polymer mixture useful in producing silicone elastomers. The filler is preferably fed into the static mixer at the same time as the other reagents.

Filler usable in the present invention, depending on the type, can act as a rheological control additive, reinforcer, extender or agent for imparting conductivity, etc. The filler may be a reinforcing filler such as fumed silica, precipitated silica, gel-formation silica, fumed titanium dioxide or carbon black; or an extending filler such as quartz powder, alumino silicate, aluminium oxide, zirconium silicate, magnesium oxide, zinc oxide, talc, diatomaceous earth, iron oxide, calcium carbonate, clay, titanium dioxide, mica, glass powder or graphite.

Preferred fillers are finely divided reinforcing fillers for silicone elastomers. Examples of such fillers include carbon black; amorphous silica such as fumed silica, precipitated silica, gel-formation silica, diatomaceous earth, and fumed titanium dioxide. The reinforcing fillers have particle sizes in the colloidal range and specific surface areas greater than 50 $m^2/g$, usually above 150 $m^2/g$. The most useful reinforcing filler is fumed silica with a specific surface area of at least 150 $m^2/g$. Silica fillers are preferably surface-treated by hydrophobising agents. Suitable hydrophobising agents include short polydimethyl siloxanes, hexamethyldisiloxane, silanes, silanol-endblocked dimethyl siloxanes or fatty acids. Preferably hydrophobising agents are used which result in di- or triorgano silyl groups being present on the surface of the fillers.

The quantity of filler used depends on the type of filler and on the application of the silicone polymer. A strongly reinforcing filler such as fumed silica or precipitated silica will generally be employed at from 1 to 70 weight parts per 100 weight parts total cyclosiloxane. The highest reinforcing performance is obtained for this range of addition. Other fillers may be used at from 1 to 200 weight parts per 100 weight parts total siloxane, but the optimal quantity is appropriately determined by experiment. The filler may be a single filler or two or more fillers may be used simultaneously, whether they be all reinforcing, all extending or a mixture of both types of fillers.

The silicone polymers containing filler producable by the present invention are useful in producing curable compositions which cure to silicone elastomers. They can be used in a manner similar to conventional mixtures of high viscosity polydiorganosiloxanes and fillers. A common method is the addition of an organic peroxide vulcanising agent to a filled polydiorganosiloxane mixture. The organic peroxide vulcanising agents suitable for use in silicone elastomers are well known. If the polydiorganosiloxane does not contain any vinyl radicals, it preferably is vulcanised with organic peroxides that are efficient in causing reactions in such polydiorganosiloxanes. Such organic peroxides are labelled "non-vinyl specific" and are represented by such organic peroxides as benzoylperoxide and 2,4-dichlorobenzoylperoxide. If the polydiorganosiloxane contains vinyl radicals, it can be vulcanised with either "non-vinyl specific" or "vinyl specific" organic peroxides. Representative of the vinyl specific organic peroxides are ditertiary-butyl peroxide and 2,5-bis-(tertbutylperoxy)-2,5-dimethylhexane. The properties of the cured silicone elastomer can be altered by the type and amount of vulcanising agent used to cure the composition. Typical changes due to such choices are well recognised in the art. The organic peroxide vulcanising agent can be present in amounts from 0.1 to 5 parts by weight per 100 parts by weight of the filled polydiorganosiloxane, preferably from 0.5 to 2.0 parts by weight.

The embodiments of the process of this invention which afford a silicone polymer having hydroxyl endgroups can be further mixed with curing agents to yield curable compositions. A number of methods are known for combining hydroxyl-containing polydiorganosiloxane in an essentially anhydrous mixture with a curing agent to yield a one part curable composition. The compositions cure to silicone elastomers upon exposure to the atmosphere. Tri-functional and tetra-functional silanes are usable as crosslinking agents as well as short polymeric crosslinkers. Among the functional groups used are acetoxy radicals, alkoxy radicals, amino radicals and amido radicals. Common catalysts for these systems include metal carboxylates, alkyl metal carboxylates, alkyl metal alkoxides and titanates. Preferred catalysts are stannous octoate, dibutyltindiacetate, dibutyltindilaurate, tetrabutyltitanate, dibutyltindimethoxide and tetraisopropyltitanate.

Silicone polymers containing two or more unsaturated monovalent aliphatic radicals per polymer molecule such as vinyl and allyl radicals can be combined with a curing agent comprising an organohydrogensiloxane having an average of more than two silicon-bonded hydrogen atoms per molecule, and a hydrosilylation catalyst, e.g. a platinum-containing catalyst in an amount sufficient to provide at least one part by weight platinum per million parts by weight polydiorganosiloxane. The organohydrogensiloxane is present in sufficient quantity to provide for at least one silicon-bonded hydrogen atom per unsaturated monovalent aliphatic radical in the polydiorganosiloxane. The polydiorganosiloxane in the mixture preferably contains from 0.01 to 2.0 mol percent unsaturated monovalent aliphatic radical.

Other additives and reagents normally used with silicone polymers and silicone polymer-filler mixtures may be included in the reaction mixture, for example additives such as thickeners, pigments, heat stability additives, oil resistance additives and flame retarding additives.

In step (ii) of the process of the present invention, the silicone polymer produced in step (i) described above is fed into a static mixer, an in-line mixer or an extruder to neutralise the catalyst. The static mixer for step (ii) can be the same or a different static mixer to that used step (i) described above. Use of the same static mixer for steps (i) and (ii) is possible due to the high speed the polymerisation reaction using the phosphazene base catalyst. The extruder can be any conventional extruder, including a single screw, twin screw or multiscrew extruder. Similarly, the in-line mixer can be any conventional mixer suitable for mixing high viscosity fluids, for example a cavity transfer mixer. When the desired polymer has been formed, the catalyst is neutralised to stabilise the product and prevent any further reaction. The neutralising agent is simply fed into the static mixer, in-line mixer or extruder downstream from where the polymerisation reaction occurs. Suitable neutralising agents include acids such as acetic acid, silyl phosphate, polyacrylic acid chlorine substituted silanes, or silyl phosphonate. In theory, a 1:1 molar ratio of neutralising agent to catalyst will be sufficient to neutralise the catalyst; however, in practice an molar excess of neutralising agent is used, for example a molar ratio of neutralising agent to catalyst of 5:1 or above, depending on reaction conditions.

In step (iii) of the present invention, the neutralised silicone polymer produced by step (ii) described above is stripped to remove volatile materials. Any conventional apparatus allowing for a continuous process may be used, for example a thin film stripper, an extruder, or an opposite or co-rotating single, twin or multishaft processor suitable for processing high viscosity fluids. The same extruder as that which may be used for step (ii) described above may conveniently be used, although a different extruder may of course be used if desired.

Stripping may be effected under conditions used for stripping silicone polymers produced using conventional catalysts, for example at temperatures of from 120 to 200° C. and under reduced pressure of 200 to 20000 Pa. However, silicone polymers produced by the process of the present invention can have lower volatile material content than silicone polymers produced using conventional catalysts by stripping the neutralised silicone polymer at temperatures at which silicone polymers produced using conventional catalysts will decompose. This is possible due to the enhanced thermal stability of the neutralised silicone polymer produced during the present process, which is attributed to the very low levels of catalyst residue left remaining in the product after polymerisation. Thus, stripping can be effected at temperatures of 200° C. and above, up to temperatures just below that at which the silicone polymer decomposes, for example at temperatures of up to 500° C. depending on the particular silicone polymer to be stripped, for example up to 250, 300, 350, 400, 450 or 500° C. The higher the stripping temperature the more effective the removal of volatile materials. Stripping is also normally conducted under reduced pressure, for example from 200 to 20000 Pa.

Silicone gum produced by the present invention in the absence of a filler may additionally be fed into high viscosity fluid processing apparatus for compounding, i.e. mixing with filler and optionally processing aids, such as filler treatment agents for rendering the filler hydrophobic. Compounding may take place after neutralisation and either before or after step (iii) described above, whichever is most convenient according to the apparatus being used. Compounding may be performed in any conventional compounding apparatus, for example an extruder, a static mixer, or an opposite or co-rotating single, twin or multishaft processor suitable for processing high viscosity fluids. The same extruder as that which may be used for steps (ii) and/or (iii) described above may conveniently be used, although a different extruder may, of course, be used if desired. If an opposite or co-rotating single, twin or multishaft processor is used for compounding and step (iii) above they must be separate to allow the process to be continuous. Suitable fillers and amounts are described above for step (i).

The present invention will now be described in detail by way of the accompanying drawing in which:

FIG. 1 is a flow diagram showing apparatus suitable for carrying out the process of the present invention.

Connected to static mixer 10 are feed lines 12, 14 and 16 for continuously feeding siloxane starting material, phosphazene catalyst and other optional additives (for example, endblocker) respectively into static mixer 10 where the ring-opening polymerisation reaction occurs under heating. The silicone polymer produced thereby is then fed downstream into static mixer 20 together with neutralising agent which is fed into static mixer 20 through feed line 22. The silicone polymer and neutralising agent are mixed in static mixer 20 to neutralise the phosphazene catalyst. The neutralised silicone polymer produced thereby is then fed downstream into thin film stripper 24 where volatile materials (substantially consisting of unreacted siloxane starting material) are removed from the silicone polymer by heating under reduced pressure. The removed volatile materials pass along line 26 to condenser 28 where they are condensed and recycled into static mixer 10. Filler in hopper 30 together with any processing aids, for example filler surface treating agents, in hopper 32 are then fed into co-rotating processor 34 via feed line 36 and compounded with the stripped silicone polymer from thin film stripper 24. Finally, the stripped and compounded silicone polymer product is removed along line 38.

EXAMPLE 1

Octamethyltetracyclosiloxane at a flow rate of 0.28 g/s, 4.5 mm$^2$/s viscosity dimethylvinyl terminated polydimethylsiloxane endblocker in an amount of 2.48% by weight of octamethyltetracyclo-siloxane, and phosphazene catalyst I above in an amount of 12.8 ppm by weight of octamethyltetracyclosiloxane were fed into a static mixer at a temperature of approximately 100° C. The resulting silicone polymer was dimethylvinyl terminated polydimethylsiloxane having an average molecular weight of approximately 51,100. The conversion of octamethyltetra-cyclosiloxane to silicone polymer was 86%.

EXAMPLE 2

The silicone polymer produced in Example 1 above was neutralised in the static mixer by feeding silyl phosphonate into the static mixer in a molar ratio excess of 15.0. The decomposition temperature of the neutralised silicone polymer was determined by thermaogravimetric analysis as 569° C.

EXAMPLE 3

Decamethylpentacyclosiloxane at a flow rate of 0.21 g/s, 4.5 mm$^2$/s viscosity dimethylvinyl terminated polydimethylsiloxane endblocker in an amount of 1.70% by weight of decamethylpentacyclosiloxane, and phosphazene catalyst I above in an amount of 33 ppm by weight of decamethylpentacyclosiloxane were fed into a static mixer at a temperature of approximately 170° C. The resulting silicone polymer was dimethylvinyl terminated polydimethylsiloxane having an average molecular weight of approximately 63,700. The conversion of decamethylpenta-cyclosiloxane to silicone polymer was 82%.

EXAMPLE 4

The silicone polymer produced in Example 3 above was neutralised in the static mixer by feeding silyl phosphonate into the static mixer in a molar ratio excess of 28.0 at a flow rate of 0.34 ml/hour whilst maintaining the temperature of the static mixer at 170° C.

EXAMPLE 5

The neutralised silicone polymer produced in Example 4 was fed to a thin film rotating evaporator for stripping. The silicone polymer was stripped at 200° C., 900–1000 Nm$^{-2}$ pressure and 165 rpm. Stripping removed volatile materials in an amount of 0.83% by weight of the silicone polymer.

That which is claimed is:

1. A continuous process for producing a silicone polymer which process comprises the sequential steps of (i) producing a silicone polymer by a polymerisation reaction selected from the group consisting of polymerisation of a linear silanol group containing siloxane by condensation polymerisation, polymerisation of a cyclosiloxane by ring opening polymerisation, and polymerisation of a mixture of said linear and cyclosiloxanes, with a phosphazene base in the presence of water and optionally a filler in a static mixer forming a reaction mixture, (ii) neutralising the reaction mixture in an apparatus selected from the group consisting of a static mixer, an in-line mixer and an extruder, and (iii) stripping the neutralised reaction mixture to remove volatile materials.

2. A process according to claim 1 wherein step (ii) is performed in a static mixer.

3. A process according to claim 1 wherein step (iii) is performed in a apparatus selected from the group consisting of a thin film stripper, extruder, and co-rotating processor.

4. A process according to claim 1 wherein the water is present in an amount of from 0.5 to 10 mols per mol of phosphazene base.

5. A process according to claim 1 wherein the phosphazene base is present in an amount of from 2 to 200 ppm by weight, based on the weight of siloxane, and the water is present in an amount of at least 1 mol per mol of the phosphazene base.

6. A process according to claim 1 wherein the phosphazene base is of a general formulae selected from the group consisting of:

$$((R^1_2N)_3P=N—)_x(R^1_2N)_{3-x}P=NR^2$$

$$\{((R^1_2N)_3P=N—)_x(R^1_2N)_{3-x}P—N(H)R^2_2\}^+\{A^-\}$$

$$\{((R^1_2N)_3P=N—)_y(R^1_2N)_{4-y}P\}^+\{A^-\} \text{ and}$$

$$\{(R^1_2N)_3P=N—(P(NR^1_2)_2=N)_z—P^+(NR^1_2)_3\}\{A\}^-$$

in which each $R^1$, is independently selected from the group consisting of hydrogen and an optionally substituted hydrocarbon group, and wherein two $R^1$ groups bonded to the same N atom may be linked to complete a heterocyclic ring, $R^2$ is selected from the group consisting of hydrogen and an optionally substituted hydrocarbon group, x is 1, 2 or 3, y is 1, 2, 3 or 4, z is an integer of from 1 to 10, and A is an anion.

7. A process according to claim 1 wherein the cyclosiloxane is of the general formula $(R_2SiO)_n$, wherein R is selected from the group consisting of hydrogen and an optionally substituted alkyl, alkenyl, aryl, alkaryl and aralkyl group having up to 8 carbon atoms, and n denotes an integer with a value of from 3 to 12.

8. A process according to claim 1 wherein the linear silanol group containing siloxane has the general formula $R^4O(SiR^5_2O)_tH$ wherein $R^4$ is selected from the group consisting of a hydrogen atom, an alkyl having up to 8 carbon atoms and an aryl group having up to 8 carbon atoms, each $R^5$ is independently selected from the group consisting of a monovalent hydrocarbon group and a halogenated hydrocarbon group and t is an integer of at least 2.

9. A process according to claim 1 wherein an inhibiting agent selected from the group consisting of carbon dioxide and excess water is present, and the polymerisation reaction is initiated by heating.

10. A process according to claim 1 wherein an endblocker is present in an amount calculated to result in a desired molecular weight range of polymer.

* * * * *